United States Patent [19]

Urbach et al.

[11] Patent Number: 5,329,758
[45] Date of Patent: Jul. 19, 1994

[54] STEAM-AUGMENTED GAS TURBINE

[75] Inventors: Herman B. Urbach, Annapolis; Donald T. Knauss, Severna Park, both of Md.

[73] Assignee: The United States of America as represented by the Secretary of the Navy, Washington, D.C.

[21] Appl. No.: 64,540

[22] Filed: May 21, 1993

[51] Int. Cl.$^5$ ............................................. F02C 3/30
[52] U.S. Cl. .................... 60/39.05; 60/39.07; 60/39.17; 60/39.3; 60/39.55
[58] Field of Search ............ 60/39.04, 39.05, 39.07, 60/39.17, 39.3, 39.53, 39.55

[56] References Cited
U.S. PATENT DOCUMENTS

| | | | |
|---|---|---|---|
| 4,297,841 | 11/1981 | Cheng | 60/39.55 |
| 4,509,324 | 4/1985 | Urbach et al. | 60/39.17 |
| 4,569,195 | 2/1986 | Johnson | 60/39.3 |
| 4,631,914 | 12/1986 | Hines | 60/39.3 |
| 4,823,546 | 4/1989 | Cheng | 60/39.55 |
| 4,841,721 | 6/1989 | Patton et al. | 60/39.05 |
| 4,899,537 | 2/1990 | Cheng | 60/39.55 |
| 4,899,537 | 2/1990 | Cheng | 60/39.55 |

Primary Examiner—Louis J. Casaregola
Attorney, Agent, or Firm—Charles D. Miller

[57] ABSTRACT

A steam-augmented gas turbine engine system generally includes a compressor (3), first and second combustors (4a, 4b), a compressor turbine (6) and a power turbine (7). A heat exchanging system (8b) removes heat from an exhaust product from the power turbine (7) and preheats water which has been desalinated by a water purification system (12). The desalinated water is provided to the first combustor (4a), as a predetermined quantity of water-steam mass, along with fuel and compressed air, and is used to efficiently power the turbine system. In one embodiment, a two-boiler system (8b) is employed in which first and second steam outputs are provided to first and second combustors (4a, 4b) such that a mass flow of the compressor turbine (6) is substantially constant from a Cheng point to a stoichiometric point of a predetermined power profile. This constancy of mass flow ensures that the gas generator operates on design from the Cheng point to the stoichiometric combustion point. Additionally, the free-power-turbine (7) always operates on design.

15 Claims, 10 Drawing Sheets

STEAM-AUGMENTED GAS TURBINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to power generation systems and more particularly to steam-augmented gas turbine engines in which the compressor turbine mass flow is nearly constant such that the compressor-turbine performance (isentropic efficiency) remains on design from a Cheng point to a stoichiometric point.

2. Description of the Related Art

In addition to the usual problems and restrictions associated with land-installed power plants such as fuel efficiency, cost, pollution control, and power, shipboard engines have special (i.e., stringent) restrictions as to space and weight. Further, the parameters of fuel efficiency and power are even more important in naval power plants, where conflicting requirements such as long patrolling range and high speed may each be achieved, as required.

To meet the above goals, various engines that have been developed for land-based power plants have been applied to shipboard power facilities. One system is a gas turbine based on a simple-cycle Brayton engine, designated the LM2500 and built by General Electric. Other engines have also been utilized which have serial compressors for increasing performance parameters such as power, fuel efficiency, etc.

Another type of system utilizes steam-augmented gas turbine (SAGT) engines which are extremely efficient and ecologically-benign. Commercial versions of this type of engine utilize steam/water flow rates up to 16% by weight of the airflow rate.

Steam-injected systems generally exhibit higher efficiency and increased specific horsepower than non-steam-injected systems. Such systems include many well-known gas turbines produced, for example, by Allison and General Electric. SAGT engines have been used for land-based applications in power-producing utilities and in manufacturing plants that require process steam. However, there has been only limited interest in shipboard application of the SAGT concept. The high efficiency of SAGT engines presents many potential benefits including a decrease in fuel consumption and extension of ship range and/or the time interval between underway fuel replenishment. Additionally, SAFT technology offers high power-turnup ratios for projected pulse-power weapon systems, and reduced stack weight, vertical moment, and IR signature.

An important concept used frequently in this disclosure is the Cheng point, described in U.S. Pat. No. 4,297,841, issued to Cheng and incorporated herein by reference, which corresponds to a SAGT engine operating at the point of maximum thermal efficiency or peak efficiency point (i.e., the so-called Cheng point). The Cheng point occurs approximately when the steam generated by exhaust gases in a waste-heat boiler becomes saturated.

Another SAGT system is disclosed in U.S. Pat. No. 4,509,324 issued to Urbach et al. on Apr. 9, 1985, and incorporated herein by reference. That system is based on a steam-augmented gas-turbine engine which includes a heat-recovery system (boiler), an intercooler, and a water-purification system.

FIG. 9 illustrates some basic concepts of SAGT systems wherein a first compressor 90 receives ambient air at its inlet, compresses the air and discharges the compressed air to an intercooler 91. The compressed air is cooled by the intercooler 91, which receives relatively pure water (i.e., having less than 0.20 parts-per-million solids) at a compatible pressure. The cooled compressed air is discharged from the intercooler 91 to a second compressor 92. The output of the second compressor is input to a combustor 93 and is used to burn fuel in the combustor in the presence of steam produced by a waste-heat boiler 94 and injected into the combustor by a steam injection means (not illustrated). The amount of fuel, steam, and compressed air introduced into the combustor is regulated in a predetermined manner to ensure operation of the engine system at a predetermined point (e.g., the stoichiometric point which is defined as the operating point where fuel and air are joined in a one-to-one chemical ratio so that all oxygen is consumed) and along a predetermined power profile curve. The use of steam in SAGT systems generally yields a specific power that is approximately threefold greater than the specific power of simple-cycle engines because a relatively negligible amount of energy is used to compress water in its liquid state. In the SAGT engine concept described above, steam/water flow rates up to 50% by weight of the air flow rate are utilized.

Thus, using up to 50% steam and/or water mixtures increases gas-turbine engine power by a factor of three or more, while maintaining the same air flow. Thus, at constant power, the total air demands are advantageously reduced and hence the size and number of gas turbine units for a given power requirement may be reduced accordingly.

The output of the combustor drives the compressor turbine 95, which drives the first and second compressors 90, 92, and a power turbine 96, which drives a load (not shown). The exhaust from the power turbine is cooled in the waste-heat boiler 94 which evacuates the exhaust to a stack and ultimately out to the ambient atmosphere. The waste thermal energy from the exhaust is used to generate steam to be input to the combustor. As discussed above, the source of energy for the injected steam and/or steam-water mixture is waste heat extracted from the effluent stack gas.

Since, as mentioned above, the energy required to compress the water is negligible, the available specific power of water is typically about 1000 hp-sec/lbm as opposed to less than 190 hp-sec/lbm for air in a simple-cycle engine. With maximum steam/water augmentation, a threefold increase in power output is achieved without any increment of air flow. At constant power, a threefold reduction in air requirements is realized. Consequently, the stack volume of intake and uptake ducts mentioned above can be substantially reduced in a SAGT engine.

Naval application of SAGT systems demands a large water-purification system, which had been considered a major technical impediment to development of a marinized version of the steam-augmented gas-turbine power plant. However, studies of water purification based on a reverse-osmosis plant have shown that less than 4200 cubic feet of space may be required to operate the SAGT engines for a destroyer with a 100,000-hp propulsion power plant. Thus, this is not a significant problem.

However, because of the wide range of mass flows necessary in the SAGT engine, difficulties arise in the previous disclosed engine from losses incurred by flow regimes which deviate severely from optimum design-point conditions. As a consequence, although the overall thermodynamic efficiency is always better than simple-cycle efficiency, the goal of high efficiency over the entire range of engine power is not always attained. This is a problem.

Further, the intercooler shown in FIG. 9 helps to increase specific power and efficiency by increasing the density of air entering the high-pressure compressor. Therefore, the annular flow area of the high-pressure compressor must be smaller to match the flow requirements. Since these changes significantly alter the characteristics of the new machine, it is very difficult to manufacture the engine from off-the-shelf components.

Further, while some commercial versions of steam-augmented gas turbines accept steam in amounts up to 16% of the compressor air flow, high levels of steam injection are avoided because commercial turbines, originally designed as simple-cycle machines with smaller flows, often undergo surge, hazardous over-speed, and serious off-design losses with greater steam injection.

SUMMARY OF THE INVENTION

It is therefore an object of the present invention to provide an improved, less costly power plant for use on ships as well as land-based operations.

A second object of the invention is to develop a low-emissions, affordable, efficient, high-power-density, gas-turbine engine, which may be produced from off-the-shelf hardware, for shipboard propulsion, power, and/or other applications.

A third object of the invention is to provide an improved shipboard engine in which the compressor-turbine power is controlled above the Cheng point.

A fourth object of the invention is to provide an improved shipboard engine in which the compressor-turbine mass flow is nearly constant, such that the turbine performance (isentropic efficiency) remains on design from a Cheng point to a stoichiometric point.

A fifth object of the invention is to provide a shipboard engine which enhances stability and which minimizes fuel consumption levels at partial loads.

A sixth object is to provide an improved method of generating power.

One mechanization of the invention has a steam-augmented gas turbine engine system which includes; compression means for receiving ambient air and discharging first compressed air flow mass; first combustion means for receiving the first compressed air flow mass, a predetermined quantity of fuel, and a first predetermined quantity of water and steam mass, and for generating a first combustion product therefrom; heat exchange means for producing the first predetermined quantity of water and steam mass and a second predetermined quantity of water and steam mass; first expansion means for receiving and expanding the first combustion product from the first combustion means to generate a first power output for powering the compression means and for discharging an expanded combustion product, second combustion means for receiving the above product, a predetermined quantity of fuel and the second predetermined quantity of water and steam mass from the heat exchange means, and for generating a second combustion product therefrom; second expansion means for receiving and expanding the second combustion product to generate second power output for powering a load coupled to the second expansion means and for discharging an exhaust product, the exhaust product being discharged to the heat exchange means; regulating means for regulating the fuel, and the first predetermined water and steam mass introduced into the first combustion means, and the fuel and the second predetermined water and steam mass introduced into the second combustion means such that the second combustion means produces a stoichiometric combustion at a power point of a predetermined power profile curve; and purification means, coupled to the heat exchange means, for receiving seawater, purifying the seawater, and discharging a first portion of the purified water to the heat exchange means, wherein the first steam receiving means is coupled to the first combustion means for providing the steam thereto, and wherein a second water and steam receiving means is coupled to a second combustion means for providing water and steam thereto; and in, conjunction with the steam to the first receiving means, a second portion of purified water is discharged directly to the first combustion means, such that the mass flow of the first expansion means is substantially constant from the Cheng point to the stoichiometric point of the predetermined power profile.

With the invention, an improved, less costly power plant for use on ships as well as land-based operations is provided. Further, the invention provides an improved shipboard engine in which the compressor-turbine power is controlled above the Cheng point and in which compressor-turbinemass flow is nearly constant, such that the turbine performance(isentropic efficiency) remains on design from a Cheng point to a stoichiometric point. Additionally, the invention provides a shipboard engine which enhances stability and which minimizes fuel consumption levels at partial loads.

BRIEF DESCRIPTION OF THE DRAWINGS

The foregoing and other objects, aspects and advantages will be better understood from the following detailed description of a preferred embodiment of the invention with reference to the drawings, in which.

Figure 1:
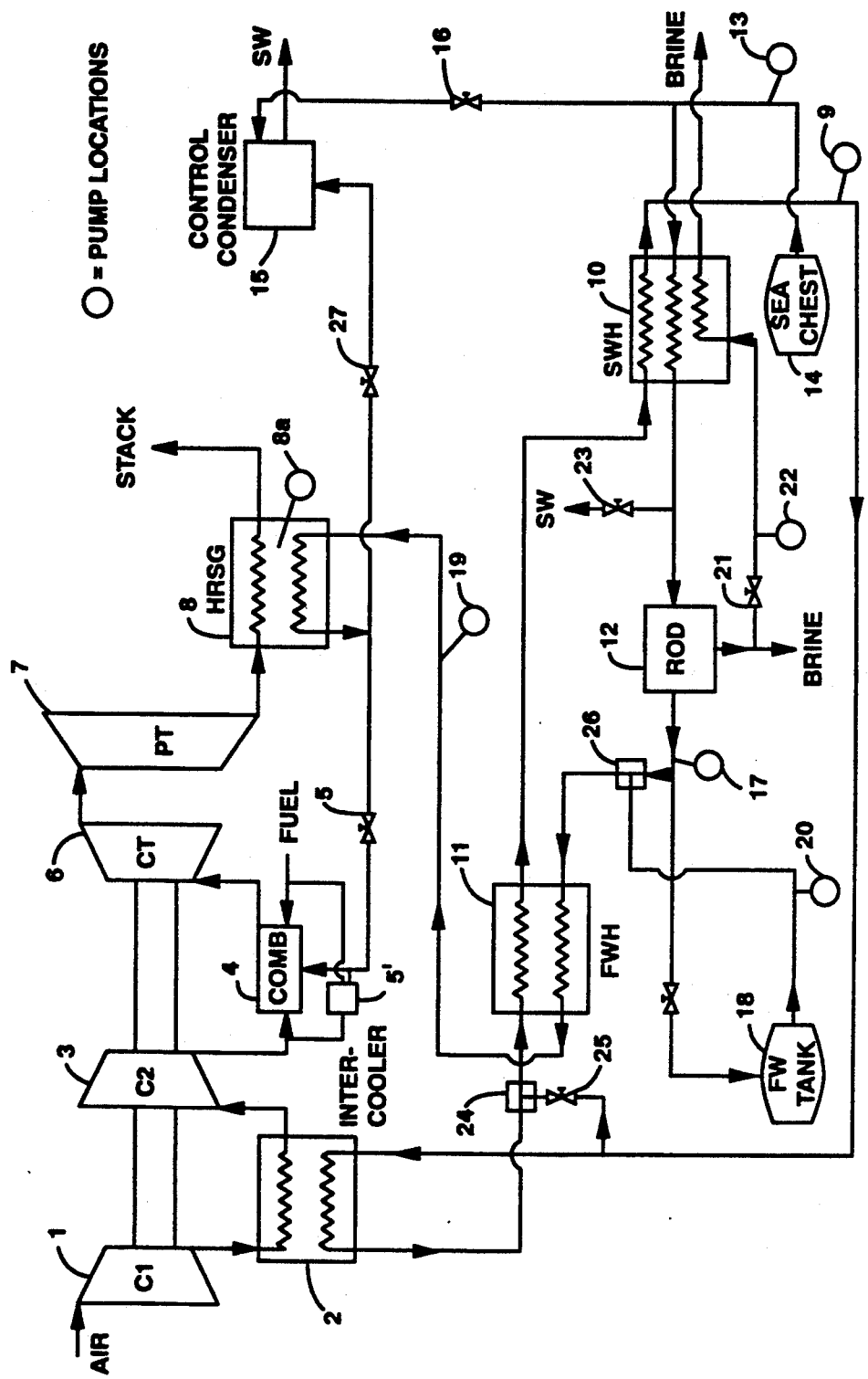
FIG. 1 is a schematic of a general embodiment of the invention including engine cooling and steam generation flow circuits.

Referring now to the drawings, and more particularly to FIG. 1, there is shown a schematic diagram of a general embodiment of a SAGT engine according to the invention which includes first and second compressors, a cooler, a compressor turbine, a power turbine and a heat exchanging system, which includes a heat recovery steam generating system and feedwater and seawater heating mechanisms, a water purification system, and a seawater storage unit.

As shown in FIG. 1, a first compressor 1 receives ambient air at its input, compresses the air and discharges the compressed air to an intercooler 2. The compressed air is cooled by the intercooler and is output to the second compressor 3. The second compressor compresses the cooled compressed air received from the intercooler 2.

The second compressor discharges the compressed air to a combustor 4, where it is used to burn fuel in the combustor in the presence of steam injected by a steam injection device 5 which may include a valve or the like.

A regulator 5', which may include a plurality of valves and sensing means, regulates the amount of fuel, steam and compressed air introduced into the combustor in a predetermined manner to ensure operation of the engine system at a predetermined point (e.g., the stoichiometric point discussed in more detail below) along a predetermined power profile curve. The output of the combustor is used to drive a compressor turbine 6, which drives the first and second compressors and a power turbine 7 and which drives a load (not shown) by expanding the combustion product from the combustor 4.

The exhaust from the power turbine 7 is output to a heat recovery steam generator (HRSG) 8. The steam generator 8 cools the exhaust from the turbine 7 and discharges the exhaust to the stack and ultimately out to the ambient atmosphere. The steam generator generates steam to be input to the combustor 4 via valve 5. The heat recovery steam generator is preferably a water tube boiler having a forced recirculation loop to maintain acceptable water quality within the evaporator. The steam generator forms part of the heat exchanging unit discussed in further detail below. Suitable control means controls system operation.

Simultaneously with the operation of the structure described above, a pump 9 circulates water from a seawater heater 10 to the intercooler 2 in a countercurrent flow arrangement with respect to the compressed air being output from the first compressor to the second compressor via the intercooler. Heat is extracted from the compressed air being generated by the first compressor 1. Much of the heat extracted from the compressed air generated in the compressor 1 is transferred to the boiler feedwater in a feedwater heater (FWH) 11.

Additional energy is extracted from the intercooler stream in the seawater heater (SWH) 10, which warms the seawater prior to entry into a reverse osmosis desalinator (ROD) 12. Seawater, optimally warmed to approximately 90 degrees F., is pumped by a pump 13 from a sea chest (seawater storage means) 14 through the seawater heater 10 to the reverse osmosis desalinator 12.

The reverse osmosis desalinator purifies and desalinates the seawater to a level of preferably 200 parts per billion (ppb) of total dissolved solid since extremely high purity steam is required for injection into gas turbines. If this quality is not obtained, wash-down frequency must increase inordinately or serious damage may occur to the gas turbine. The water treatment system must also be designed to minimize power consumption. Water treatment systems other than distillation systems may be used to produce the high purity water for steam injection, including (1) membrane distillation (MD), (2) two-pass reverse osmosis (RO), (3) two-pass RO followed by continuous deionization and (4) a three-pass RO.

Water from the sea chest 14 is also pumped by pump 13 to a control condenser 15 via a valve 16. The condenser 15 functions to evacuate steam not used by the combustor and quickly condenses steam to purge it from the system during emergency engine shutdowns. Seawater cools the steam preferably by direct contact. The control condenser 15 is coupled to the output from the steam generator via regulating means 27, as shown in FIG. 1, and an output from the seawater chest 14 via regulating means 16. A predetermined water/steam mass is provided from the steam generator to the combustor via regulating means 5.

Purified water from the ROD 12 is pumped by a pump 17 to a plurality of feedwater (FW) tanks 18 or the feedwater heater 11. A pump 19 delivers the purified water from the feedwater heater at pressure to the heat-recovery steam generator 8. The steam generator 8 includes a recirculating pump 8a for preventing fouling of the boiler by ensuring that the heat-exchanger surfaces are never dry.

A pump 20 in line with the plurality of tanks 18 provides additional purified water to the steam generator 8, via the feedwater heater 11, as required. As mentioned above, the steam generator generates steam which is returned to the combustor to provide power to the compressors, compressor turbine and power turbine.

Warmed rejected brine from the reverse osmosis desalinator 12 may be rejected to the sea and/or may be passed, via a valve 21 and pump 22, through the seawater heater to extract heat, depending upon the ambient water temperature. For example, if the ambient water temperature is less than 85 degrees F., then it may be advantageous to extract heat therefrom by passing it through the seawater heater 10. Further, seawater may be rejected, as required, via a valve 23 in line between the input of the ROD and the output of the seawater heater.

The intercooler 2 is preferably a plate/fin type exchanger, and the SWH and the FWH preferably are a plate/frame type. All units preferably employ a counterflow arrangement to ensure maximum efficiency of thermal energy transfer.

Various regulating means, sensing means and monitors may be suitably employed with the above-mentioned structure to ensure maximum efficiency and output of the system. For example, a regulating means 24 and valve 25 is employed in line between an output of the intercooler and an input of the feedwater heater to transfer heat from the heated water from the intercooler to the feedwater heater and the water being provided to the heat recovery steam generator. The regulating means also is positioned in line between the inlet of the feedwater heater 11 and the output of the seawater heater 10 to regulate flow of seawater from the heater 10 to the feedwater heater 11.

A second regulating means 26 may be advantageously employed in line between the output of the feedwater tank and an input of the feedwater heater. The second regulating means 26 may also be employed in line between the output of the ROD 12 and the input of the feedwater heater, as shown in FIG. 1.

As mentioned above, other regulating means are preferably employed to regulate the amount of fuel, and water and steam mass from the steam generator 8, in accordance with predetermined maps or the like to achieve maximum efficiency along a predetermined power profile.

Looking at the system in greater detail and specifically the heat exchanging system, to maximize the thermal efficiency of the overall plant, illustrated in the schematic of FIG. 1, thermal energy from the intercooler 2 is utilized by the seawater heater 10 which heats seawater for the reverse osmosis desalinator 12, and by the feedwater heater 11, which serves the heat-recovery steam generator 8. Any residual energy/heated water not utilized in the ROD is dumped overboard with seawater discharge. Further, a valve 23 may be installed in line between the output of the seawater heater and the ROD to evacuate seawater therefrom, as required. During operation of the SAGT engine at stoichiometric conditions or at low-ambient temperature, seawater heating can be augmented by diverting warm brine from the ROD through the SWH via a valve 31.

An important consideration in sizing the heat exchanger within the purview of those skilled in the art and in light of the present disclosure of FIG. 1 is to maintain, under operating conditions, an ROD seawater inlet temperature of preferably approximately 90° F., while maximizing the heating of the heat recovery steam generator feedwater. This must be done over a broad range of steam rates (i.e., the Cheng point, discussed in further detail below, to the stoichiometric point) and at all ambient temperatures.

While the design points for the intercooler, FWH and HRSG are governed only by stoichiometric operation at 100° F. ambient temperature, the design of the seawater heater is governed by three different operating conditions. For example, design of the seawater heater considers (1) high ambient temperature under loss of water (ROD shutdown), (2) low ambient temperature with water production, and (3) high-ambient temperature, with Cheng-point operation, where relatively high heat loads, combined with ROD inlet temperature constraints, demand much higher seawater flows than those encountered at any other operating conditions.

Figure 2:
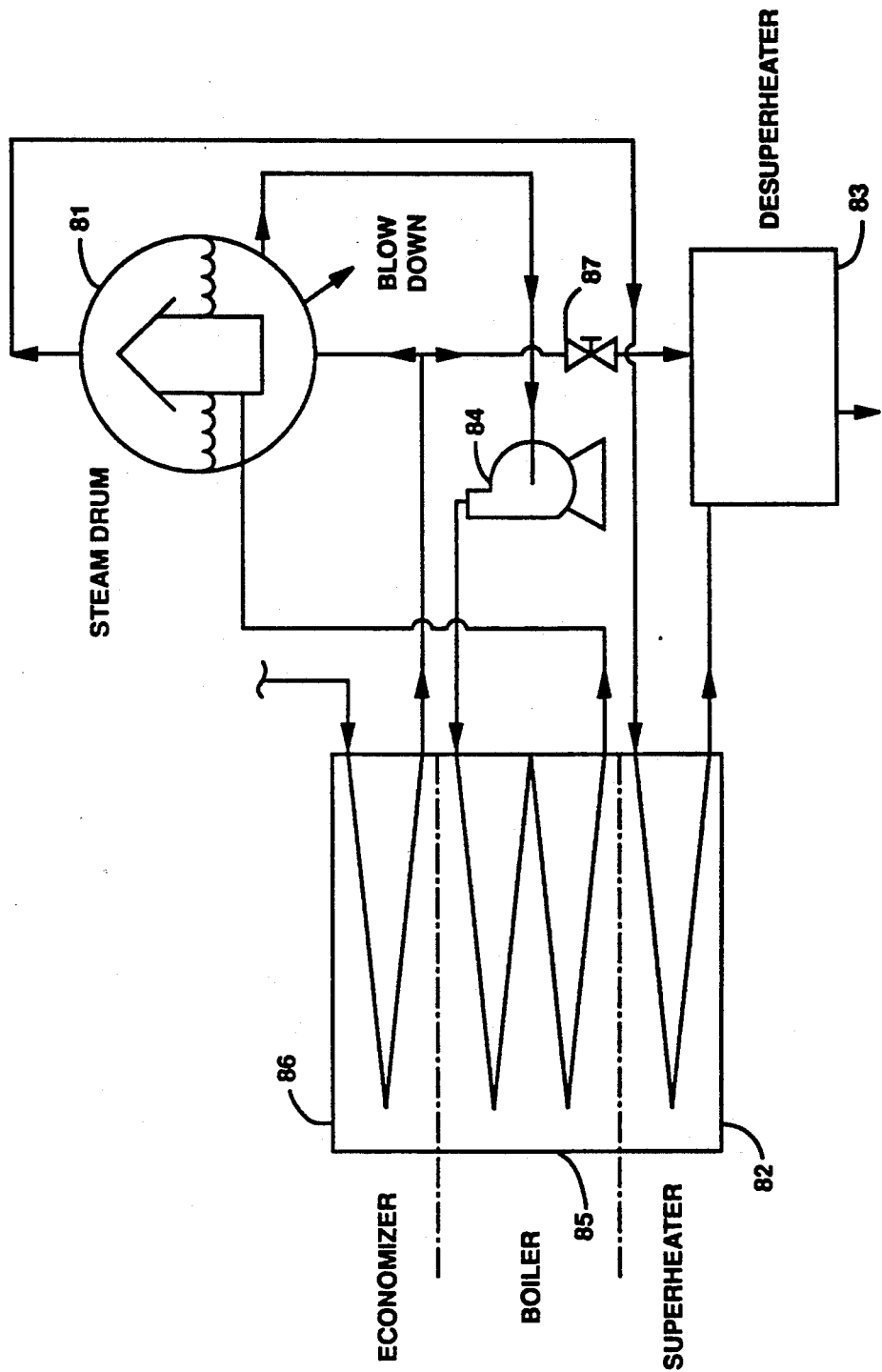
FIG. 2 illustrates a heat recovery steam generator (HRSG) with a recirculating boiler which is a portion of the SAGT engine shown in FIG. 1.

FIG. 2 shows a general embodiment of the heat recovery steam generator 8 in which a desuperheater 83 is employed because of the extremely broad range of steam flows demanded by the plant; e.g., between the Cheng point and stoichiometric point, the water flow increases by a factor of about 2.5.

In FIG. 2, a steam drum 81, which collects saturated steam, is coupled to a superheater 82 for generating dry steam and which in turn is coupled to a desuperheater 83. Blow-down of water is performed to evacuate excess water and solid contaminants (i.e., salt) from the steam drum. The desuperheater 83 mixes cold water and superheated steam to condense the steam. Another output of the steam drum is coupled to a recirculating pump 84 which in turn is coupled to a boiler 85 which heats the water input by pump 84. Boiler 85 provides the steam/water product to the steam drum. An economizer 86 is provided for receiving water from an external unit (i.e., the feedwater heater or directly from the ROD unit, not shown in FIG. 2) and for delivering an input to the steam drum and to the desuperheater 83 via a regulating means (i.e., valve 87) or the like.

The weights and volumes of the various heat exchanging units for a 100,000-hp plant are presented below in Table 1.

TABLE 1

| WEIGHTS AND VOLUMES OF VARIOUS HEAT EXCHANGER MEMBERS. | | |
|---|---|---|
|  | WET WEIGHT (LBS) | VOLUME (FT$^3$) |
| INCLR | 3915 | 89 |
| SWH | 7049 | 124 |
| FWH | 2510 | 60 |
| HRSG |  |  |
| CORE | 42688 | 674 |
| NOZZLE & DIFFUSER | 6592 | 1720 |
| STEAM DRUM | 13440 | 306 |
| DESUPERHEATER & CONDENSER | 4480 | 140 |
| TOTAL | 80674 | 3113 |

At initiation of injection, the water is highly superheated but below the turbine inlet temperature (TIT). Since, for nominal increases in water flow, little additional fuel is required to maintain the TIT at the desired value, the thermal efficiency increases rapidly. The peak efficiency point (i.e., the Cheng point) occurs approximately where the steam becomes saturated. As more water is introduced, the specific enthalpy of the steam and/or the steam-water mixture drops off. Increasing the amounts of injected steam and/or steam and water mixture requires more fuel to maintain the TIT. Thus, beyond the Cheng point, the overall thermal efficiency falls monotonically to the stoichiometric-point value, which may be above comparable simple-cycle efficiencies.

The most likely ship-power demand corresponds to an engine power level in the vicinity of the Cheng point. The maximum specific power of SAGT engines is approximately threefold greater than the specific power of simple-cycle engines. Thus, at constant power, the total air demands may be reduced threefold. Since the airflow of a gas turbine is a measure of its overall cost, the size and number of gas turbine units for a given power requirement may be reduced. Additionally, because boiler and water purification systems are not as expensive as gas turbines, there may be a modest cost reduction over systems employing simple-cycle engines.

Regarding engine sizing for a chosen propulsion system, a choice of four, rather than two, engines in the destroyer application provides a redundancy that addresses the Navy need for survivability, and also allows for more efficient energy consumption. However, the choice of two engines, employed herein for the SAGT engine, simplifies design and construction, and provides a reduction of initial costs.

The high specific power of steam (1000 hp-sec/lbm mentioned above) produces, in the SAGT engine at the stoichiometric point, a specific power of about 590 hp-sec/lbm of working fluid in the compressor. The specific power of an LM2500 engine, commercially available from the General Electric Corporation and the standard propulsion engine for destroyers, is 187 hp-sec/lbm. Thus, the specific power of the working fluid in the SAGT engine is about three times greater than that of the LM2500 engine (i.e., a 3.1:1 ratio). Thus, the power generation by the SAGT engine is much higher than that of the conventional LM2500 engine.

One LM2500 engine delivers 25,000 hp in the simple-cycle mode, whereas a SAGT engine operating at the stoichiometric point, delivers only 16,100 hp in the simple-cycle mode. However, with injection of steam, the factor of 3.1:1 increases the power output of the SAGT engine to 50,000 hp. Thus, only two SAGT engines operating at stoichiometric conditions are required to yield 100,000 hp normally supplied by four LM2500 engines.

Air consumption may be estimated by proportioning the air flow and power ratios of off-the-shelf commercial engines. The proportioning leads to an air flow of 94.3 lbm/sec for one engine at 59 degrees F. ambient temperature, which, for a 100-degree F. day, corresponds to 87.4 lbm/sec, or 175 lbm/sec for two engines. This air-consumption rate and power suggest that the air consumption of the SAGT compressor is similar to the air consumption of a conventional LM1600 gas turbine.

The injection of large quantities of steam into the combustor requires an increase in the cross-sectional areas of the combustor and the subsequent turbine stages to accommodate the increased volume of flow. If the cross-sectional areas of the combustor and the turbine stages were not increased, problems relating to choking, overspeed, vibration and destruction would arise. The stoichiometric quantity of water needed for a gas turbine varies with the particular cycle character, such as the bleed rates and the maximum allowable combustion temperature. For example, within the purview of those skilled in the art, for a TIT of 2200 degrees F., the percentage of water (i.e., with respect to air) injected into the combustor will be about 47.5%. With provision for a 5% steam bleed for cooling, the total water demand with respect to air may exceed 52.5%. A 2% overboard bleed air rate (1.8 lbm/sec) for cooling is diverted from the turbines and dumped into the stack. Data for the mass flow rates at stoichiometric conditions, including fuel and steam, are listed in Table 2 below.

TABLE 2
ANTICIPATED MASS FLOWS FOR SELECTED FLOW STATIONS IN A 50,000-HP SAGT ENGINE.

| FLOW STATION | MASS FLOW RATE (LB/SEC/UNIT) |
| --- | --- |
| Compressor Inlet | 87.4 |
| Overboard Air Bleed | 1.8 |
| High Pressure Turbine Inlet | 133.0 |
| Gas-side Boiler Inlet | 139.0 |
| Water-side Boiler Inlet | 45.1 |

The turbine flow matches the inlet flow for an LM2500 engine. Further, water consumption at the Cheng point is about 40% of the consumption rate at the stoichiometric point (coolant steam is included in this calculation). Water-production rates corresponding to full-throttle or near full-throttle power are required for only a small percentage of overall operating time. Indeed, studies have shown that the time needed for speeds exceeding 27 knots is only 6% of the total time (but 15% of the total fuel consumption). For some ships underway at cruise speeds or less, it would be impossible to store (in the fuel tanks) all the water produced by a water plant sized for stoichiometric consumption.

With steam and/or water injection as a standard operating procedure over the entire range of power, the low-end range of compressor mass-flow rates and power is expanded. The additional flow of steam in the turbines stabilizes operation of the compressors at lower mass flows, where they are subject to stall. However, at high mass flows, where high power is demanded, choking, vibration and overspeed (i.e., of the turbine blades) are problems as mentioned above.

For highest fuel efficiency, the SAGT gas turbine of the invention is designed so that the ship cruise condition is in the neighborhood of the Cheng point. SAGT turbines attain peak permissible pressure ratios and TIT near the Cheng point, where compressor flow is maximum. Between the Cheng point and the stoichiometric point, the compressor section is expected to operate at a fixed speed compatible with the maximum air flow rate and TIT.

With increased steam injection above the Cheng point, the compressor turbine must accept, without choking, as much as 30% additional mass flow having 10% greater specific volume, with the potential to do about 45% more work. Choking flow is preferably avoided by increased pressure and/or lower temperature, reduced consumption of air, expanded annular areas, or bleeding of the working fluid through some bypass to downstream stages.

Figure 3:
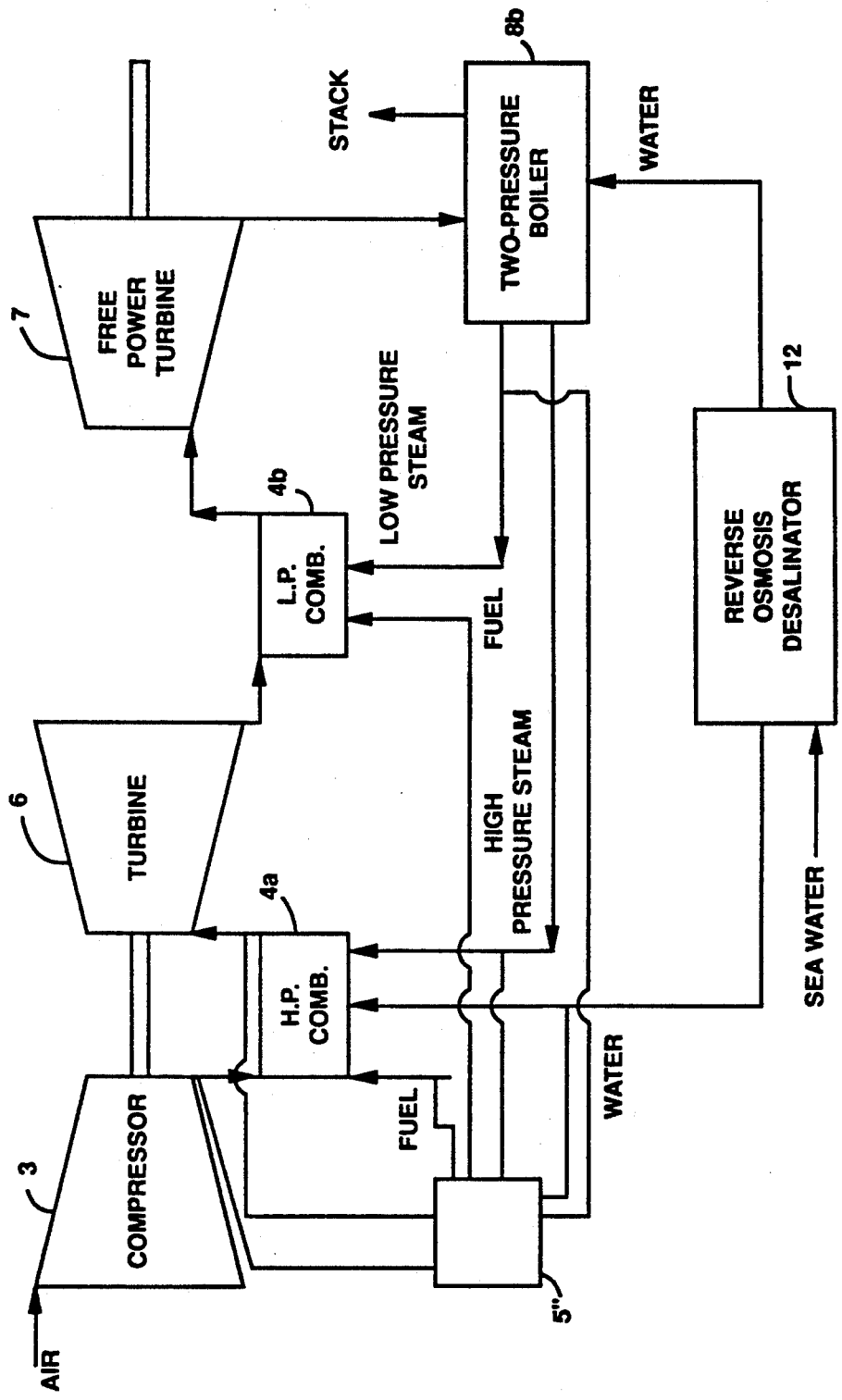
FIG. 3 is a schematic of another embodiment of the present invention illustrating a reheat steam-augmented gas turbine (SAGT) engine with a two-pressure boiler.

Another embodiment of the invention is illustrated in FIG. 3, in which like elements shown in the embodiment of FIG. 1 are shown by like numerals. With this embodiment, compressor-turbine mass flow above the Cheng point is nearly constant, such that the turbine performance (isentropic efficiency) remains on design from the Cheng point to a stoichiometric point.

Generally, the embodiment of FIG. 3 utilizes many of the same elements as that of FIG. 1. However, it dispenses with the intercooler, and (See the system of FIG. 3) incorporates a low-pressure combustor 4b, which provides some reheat prior to the free-power turbine 7. A two-pressure, recirculating, waste-heat boiler 8b provides steam to the combustors. A reverse-osmosis desalination water treatment system 12 generates highly purified water for the boiler(s). In the absence of water, SAGT power production may continue at reduced power.

The two-pressure boiler system 8b of FIG. 3 provides for proper distribution of steam flow into the combustors. This two-pressure boiler system addresses the problems associated with stoichiometric operation, such as compressor overspeed and off-design losses. The two-pressure SAGT of FIG. 3 permits the flow regimes to be controlled in a manner which maintains the system close to design conditions and high efficiency.

Looking at the SAGT engine illustrated in FIG. 3 in greater detail, low-pressure steam is routed at matching pressure, through a conventional lossy throttle, directly to a low-pressure combustor 4b upstream of the power turbine 7. The design point mass flow in combustor 4b is about 25% water (i.e., not the Cheng point). The inlet temperature to the turbine is held substantially constant even with maximum fuel flow at the stoichiometric point, by decreasing steam quality. Reheating of the working fluid prior to entry into the free power turbine 7 increases efficiency of the system. System operation is controlled by suitable control means, and the fuel, water and steam masses input to the first and second combustion chambers are regulated by suitable regulating means indicated generally by item 5".

Figure 10:
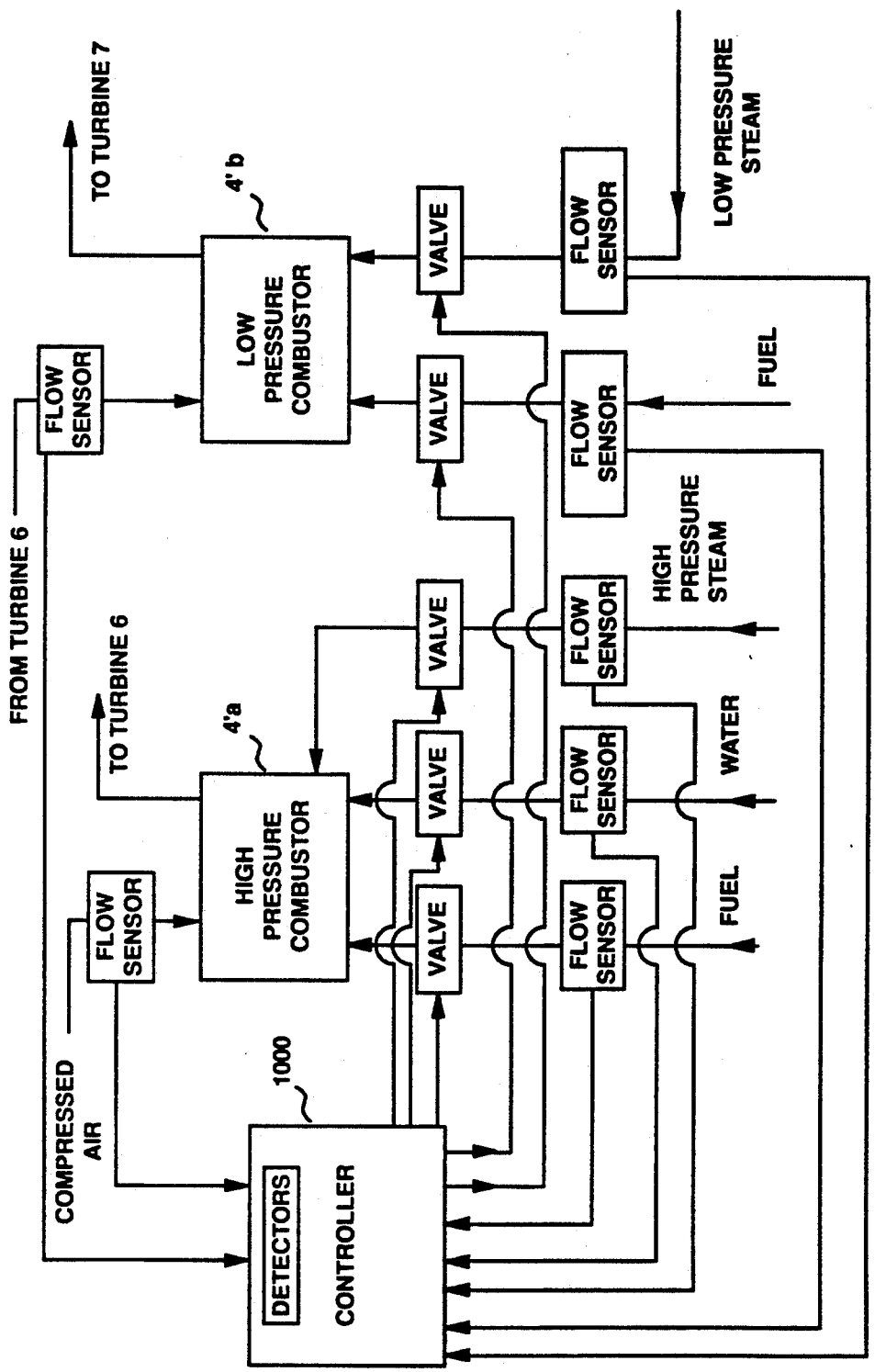
FIG. 10 is a schematic diagram of one possible flow control scheme for the FIG. 3 device.

FIG. 10 is a diagram illustrating schematically one method of controlling the flow of fuel, water and steam to the combustors of the FIG. 3 embodiment of the invention. The controller, item 1000 can be comprised of any conventional means which will sense the levels of the signals arriving from the various flow meters or sensors and will send out signals to actuate the various flow control valves in response to detection of particular levels of the sensed signals. The controller function can be mechanized using conventional electrical, electromechanical or electrohydraulic components or alternatively by a suitably programmed microprocessor. The particular levels to be detected will depend upon the specific design of a particular machine. Other schemes to control flow will be obvious to those of skill in the art. For instance simple detectors (electrical, electromechanical or electrohydraulic) can be used to sense the flows and actuate the valves directly.

It is important to consume as much fuel as possible in the high-pressure combustor to achieve high specific power. If insufficient fuel is burned in the high-pressure combustor, the burden of attaining stoichiometry is shifted to the low-pressure combustor. Thus, the elevation of temperatures in the free-power-turbine and the boiler may exceed levels compatible with the material integrity of these components. The contrivance of using cold water in conjunction with sufficient fuel to attain stoichiometry is clarified by reference to FIG. 4.

Figure 4:
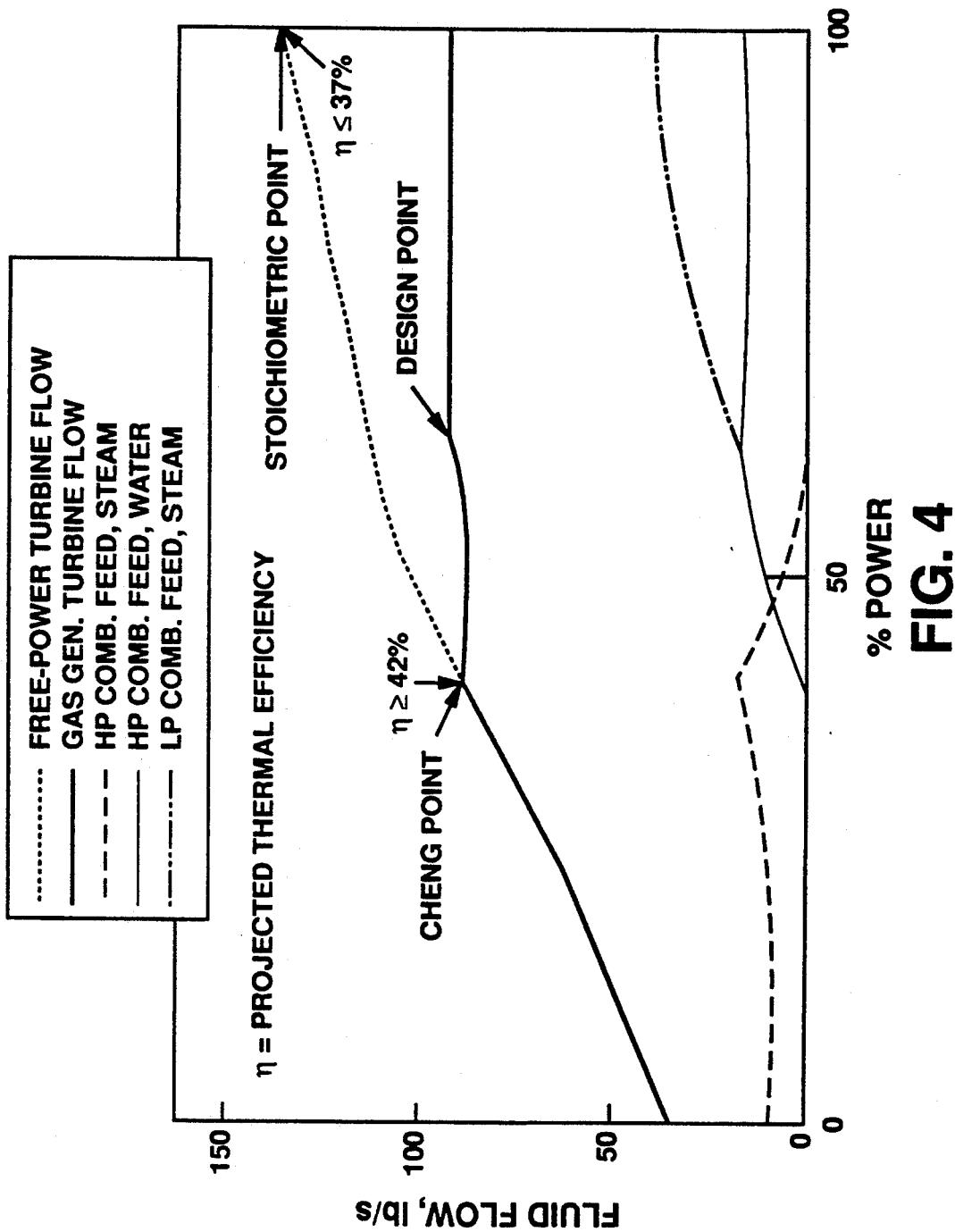
FIG. 4 illustrates the SAGT turbine flow regimes.

A gradual diversion of the steam flow, away from the high-pressure combustor to the low-pressure combustor, is contrived to avoid a wide variation in mass flows, and efficiency remains high. As shown in FIG. 4, the steam flow to the high-pressure compressor is replaced, pound for pound, with equal amounts of cold water. Thus, the mass flow in the gas generator(compressor and compressor-turbine) is nearly constant, except for addition of fuel, over a wide range of power output (from about 35% to 100% of power in FIG. 4). The scheme permits consumption of most of the fuel and oxygen in the high-pressure combustor.

At power levels below 35%, the gas generator is stabilized by the steam flow injected into the turbine. Therefore, the gas generator remains close to the design point operation most of the time. Since the free-power turbine may accelerate freely with mass flow, the free power turbine is on design all the time. The partial reheat capability of the new SAGT engine is available for operation during any flow regime.

The gas-turbine engine of the FIG. 3 embodiment includes provisions for reheat and design-point operation over a wide range of power up to the stoichiometric combustion point.

The design point in FIG. 4 is the point where fuel addition to the low pressure combustor must begin in order to achieve full-power stoichiometric operation. However, fuel addition may begin sooner to take advantage of the promise of the higher efficiency provided by reheat. The free-power turbine mass flow, indicated by the dotted line, becomes identical with the gas-generator flow below the Cheng point.

Thus, FIG. 4 illustrates that at the Cheng point, steam is diverted from the high-pressure combustor 4a to the low-pressure combustor 4b. However, the turbine mass flow (see the solid curve) is nearly constant, except for small additions of fuel, because water is injected into the high-pressure combustor 4a in amounts precisely equal to the diverted steam.

Thus, with the structure of the invention, the gas generator achieves its design objectives, with respect to mass flow, from the Cheng point to the stoichiometric point. Specifically, as clearly shown in FIG. 4, the fluid flow rate of the compressor turbine from the Cheng point to the stoichiometric point is substantially constant, with the free power turbine 7 remaining on its theoretical performance profile (i.e., its design) so long as speed of the turbine drive shaft is proportional to the axial working-fluid velocity. Further, the free power turbine 7 utilizes blades which have a constant shape and are at a fixed optimum orientation. Thus, no adjustable inlet vane blades are required by the free power turbine of the invention.

More importantly, the two-pressure boiler 8a eliminates the need for design of a hot-end bypass valve, cooled manifolding for bypassed flow, and cooled blades in the first stage of the power turbine. With the two-pressure boiler, combining components from the existing gas-turbine components may be performed to achieve the desired machine, and indeed such is contemplated by the present inventors. Since the new SAGT engine dispenses with an intercooler, assembly of the engine is contrived largely from off-the-shelf hardware. Thus, excluding development costs, the engine is expected to be cost-wise competitive with the baseline engine. Further, compressor-turbine power is controlled above the Cheng point and compressor-turbine mass flow is nearly constant, such that the turbine has constant performance from the Cheng point to the stoichiometric point.

To validate the inventors' findings, the performance of the SAGT systems was computed using real-gas data with a point-design program and a map-matching program. The two programs offered a cross-check on their consistency with respect to first and second-law thermodynamic checks. Most of the data were based upon the conventional internal bypass concept which diverts excess working fluid around the compressor-turbine. Data on efficiency are expected to be higher with the reheat SAGT concept shown in FIG. 3.

The prediction of performance was aimed at the previously discussed 50,000-horsepower steam-augmented gas turbine for a destroyer (i.e., a DDG 51 class vessel) with two power plants, rather than the customary four. The performance prediction program was written to accept a wide range of variables and could be extended to almost any reasonable range for a SAGT design. Some design parameters and inputs are listed in Table 3.

TABLE 3

| Principle design input data | |
|---|---|
| Maximum Turbine Inlet Temperature | 2200 F. |
| Maximum Pressure Ratio | 16 |
| Minimum WHB Exhaust Temperature | 450 F. |
| Ambient Temperature | 100 F. |
| Seawater Temperature | 85 F. |
| Lower Fuel Heating Value | 18,300 BTU/lbm |

TABLE 3-continued

| Principle design input data | |
|---|---|
| Maximum Compressor Efficiency | 0.86 |
| Maximum Turbine Efficiencies | 0.90 to 0.92 |
| Burner and Gas Generator Efficiency | 0.995 |
| Pressure Loss Ratio | |
| Burner | 0.035 |
| Intercooler | 0.02 |
| Intercooler Effectiveness | 0.88 |
| Stoichiometric Point | 0.735 |
| Cheng Point Stoichiometric Fuel-Air Ratio | 0.0658 |

Location of the Cheng point varies, depending primarily on design conditions, component efficiencies, water-air ratios, and general limitations. The design point is preferably chosen to distribute fuel consumption between the combustors in a manner which optimizes performance and is compatible with material temperature limits.

Slightly superheated steam is used in place of compressor bleed air for blade cooling purposes. Since steam has twice the specific heat of air, the mass flow is only about half that required for comparable air cooling. In computer calculations, a steam-cooling bleed flow and a compressor air bleed flow of 0.035 and 0.02 pounds per pound of inlet air per second, respectively, are used. Half of the air bleed was considered lost as overboard bleed while the remaining bleed air and all the steam bleed were recombined with the main flow, for calculational purposes, between the compressor turbine and the power turbine.

Figure 5:
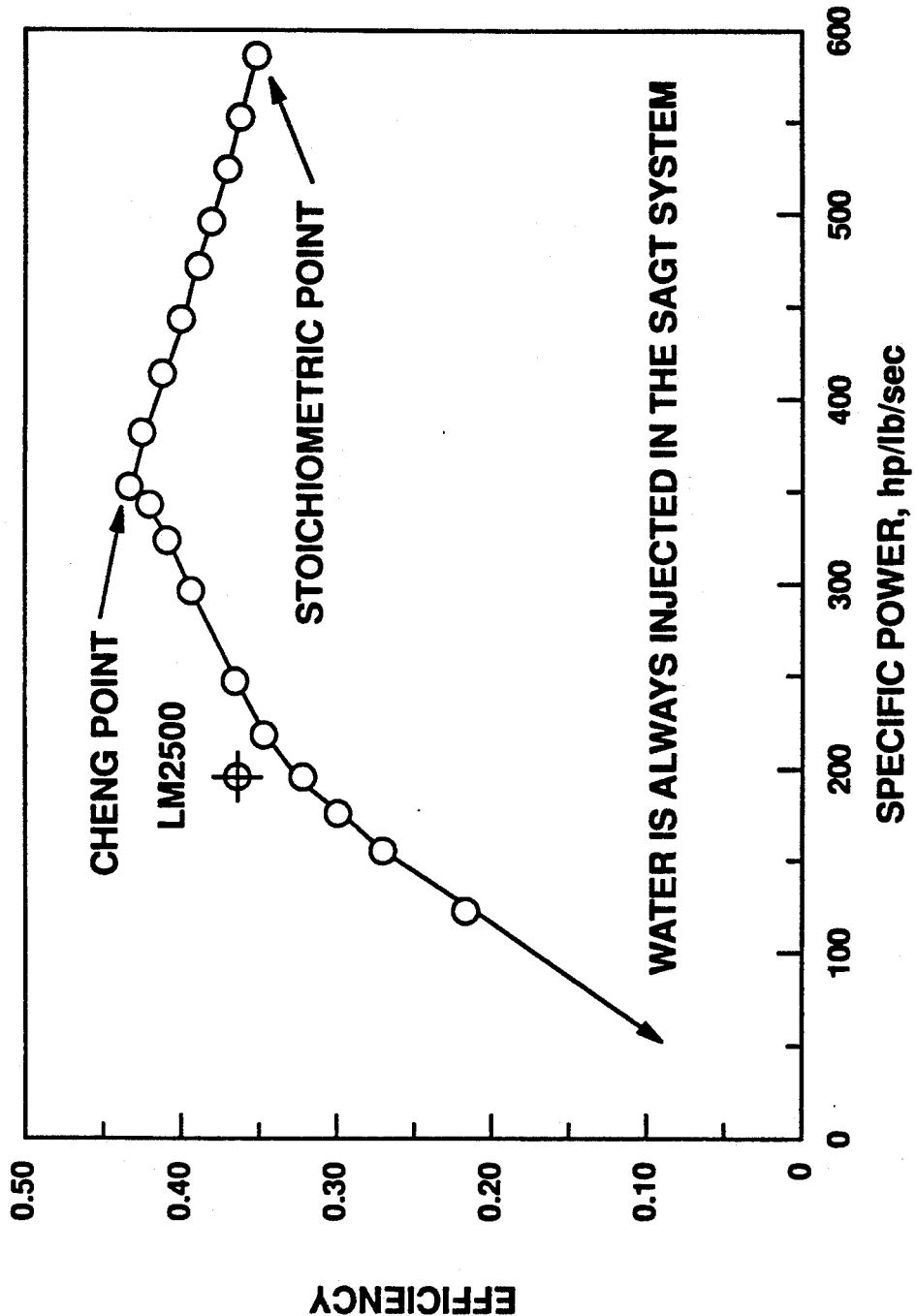
FIG. 5 illustrates a relationship between the overall thermodynamic efficiency versus specific power for a SAGT engine having an intercooler.

FIG. 5 illustrates the performance of the steam injected gas turbine over its power range for the basic inputs of Table 3. Overall thermal efficiency is plotted versus specific power, where specific power represents how much output horsepower can be obtained per pound of inlet air per unit time.

As a basis for comparison, the aforementioned specific power of the present marinized LM2500, 187 hp-sec/lbm, with a thermal efficiency of 36 percent, is shown as a single point in FIG. 5. The SAGT turbine has specific powers of 350 and 588 hp-sec/lbm of inlet air and thermal efficiencies of 42.8 and 35.2 percent at the Cheng and stoichiometric points, respectively. Selected data from a simulation program are included in FIG. 5, with corrections for losses from operation of the reverse-osmosis water plant.

The high specific power of the SAGT engine permits a single SAGT turbine to replace a pair of LM2500 engines and produce the same maximum power with only about one-third of the stack requirement. The peak efficiency region around the Cheng point falls in the mid-power range, which represents the majority of ship operational life.

Turning to the main reduction gear for the SAGT engine, the engine room on the DDG-51 class destroyer is currently equipped with two LM2500 gas turbines, a dual-input, single-output, locked-train, double reduction (LTDR) main reduction gear (MRG) and supporting equipment for a controllable/reversible pitch (CRP) propeller. Even with one turbine eliminated, engine-room changes may be kept to a minimum since the 50,000-hp SAGT engine will have approximately the same footprint as a 25,000-hp LM2500. Preferably, the SAGT engine is placed on the existing foundation for the inboard LM2500 and the center distance from the turbine shaft to the propeller shaft remains unchanged. Also, for strict comparability with the existing DDG-51, a controllable/reversible pitch propeller is assumed. No modification to the 50,000 hp DDG-51 CRP is required.

A single-input, single-output, locked-train, double-reduction gear similar to one branch of the DDG-51 MRG is preferably used. This would allow the turbine shaft and propeller shaft centers to be maintained and would provide access to the center of the propeller shaft at the forward end, which is needed to mount the oil distribution box for control of the CRP.

Direct comparability is maintained by continuing to use a K factor (a measure of surface hardness) of 350 for the conceptual gear design. The length-to-diameter (l/d) ratio of the pinions is allowed to go as high as 2.1, provided that helix angle corrections are made on the teeth. This restriction is due to pinion bending when loaded and is not likely to be increased. While there is some margin to both limits in the first reduction of the DDG-51 MRG, both K factor and l/d ratio are near their limits in the second reduction. Major design parameters, and final weight and volume data for the single input 50,000-hp LTDR gear are shown in Table 4.

TABLE 4

| Locked train double reduction gear parameters for use with 50,000-hp SAGT turbine and CRP. | | |
|---|---|---|
| | First Reduction | Second Reduction |
| K-Factor | 350 | 350 |
| Pinion Speed, rpm | 3600 | 1100 |
| Gear Speed, rpm | 1100 | 168 |
| Pinion Pitch Dia., (in.) | 13.96 | 17.21 |
| Gear Pitch Diameter (in.) | 45.69 | 112.70 |
| Face Width, (in.) | 16.75 | 31.84 |
| Center Distance, (in.) | 29.82 | 64.96 |
| Pinion l/d Ratio (incl. 4" gap) | 1.49 | 2.08 |
| Weight, lbs, total | | 124,700 |
| Volume, cu. ft., total | | 445,500 |

The substantially lower air flow and the increased density of the stack effluent gases permit a large reduction in stack system volume. Tables 5 and 6 detail the calculations estimated to determine the stack volume and weight of the SAGT system. Dimensional data for the SAGT system in Table 6 are not given since there is no extant hardware. The areas were computed from an analysis of the mass flows and the effects of molecular weight and temperature on the density of the effluent gases. Volumes of the stacks were based upon the computed areas and the stack heights of the baseline propulsion power plant. The weight of the SAGT stack system was obtained by assuming a linear proportionality between the weight and volume.

TABLE 5

| Stack system data for LM2500 systems | |
|---|---|
| Intake mass flow for one engine | 133.3 lb/sec |
| Secondary cooling flow | 26.5 |
| Total flow at the intake | 159.8 |
| Uptake flow for the | 135.7 |

TABLE 5-continued

Stack system data for LM2500 systems

| | |
|---|---|
| engine | |
| Untake flow plus cooling flow | 162.5 |
| Intake | |
| 8.25 ft. length | |
| 7.73 ft. width | |
| 53.0 ft. height | |
| 63.8 ft² area | |
| 3381 ft³ volume | |
| Uptake | |
| 7.63 ft. length | |
| 5.0 ft. width | |
| 63.0 ft. height | |
| 38.2 ft² area | |
| 2407 ft³ volume | |
| Stack volume per engine | 5788 |
| Stack volume for four units | 23152 |
| Estimated stack spacing volume | 3450 |
| Total stack system volume | 26500 ft³ |
| Total SWBS stack system weight including casing | 176.6 t |

TABLE 6

Stack system data for a SAGT system

| | |
|---|---|
| Intake mass flow for one engine | 87.4 lb/sec |
| Secondary cooling flow | 26.5 |
| Total flow at the intake | 113.9 |
| Uptake flow for the engine | 139.0 |
| Uptake flow plus cooling flow | 165.5 |
| Intake | |
| 53.0 ft. height | |
| 46.9 ft² area | |
| 1709 ft³ volume | |
| Uptake | |
| 63.0 ft. height | |
| 27.1 ft² area | |
| 2486 ft³ volume | |
| Stack volume per engine | 4195 |
| Stack volume for two units | 8390 |
| Estimated stack system spacing | 1740 |
| Total stack system volume | 10130 ft³ |
| Total SAGT system stack weight by proportion | 60.7 t |

An alternative propulsion plant which may be employed is the intercooled regenerative (ICR) gas turbine power plant. The intake and uptake flow areas were based upon employing 3.79 ICR engines since the power output of an ICR engine is 5.5% greater than the power output of an LM2500 engine. Also, the lower temperature in the effluent gas of the output increases the gas density and reduces the overall uptake stack size. The computed data for the volume and weight of the ICR plant are 23170 ft3 and 135.7 t, respectively.

Application of the invention to an existing gas turbine, such as the propulsion plant of a DDG-51, and the feasibility thereof must include examination of the system fuel consumption. The typical engine performance data of FIG. 6 show the specific fuel consumptions as a function of percent total output of the three engine types, i.e., the baseline LM2500, the ICR, and the SAGT engine of FIG. 1.

Figure 6:
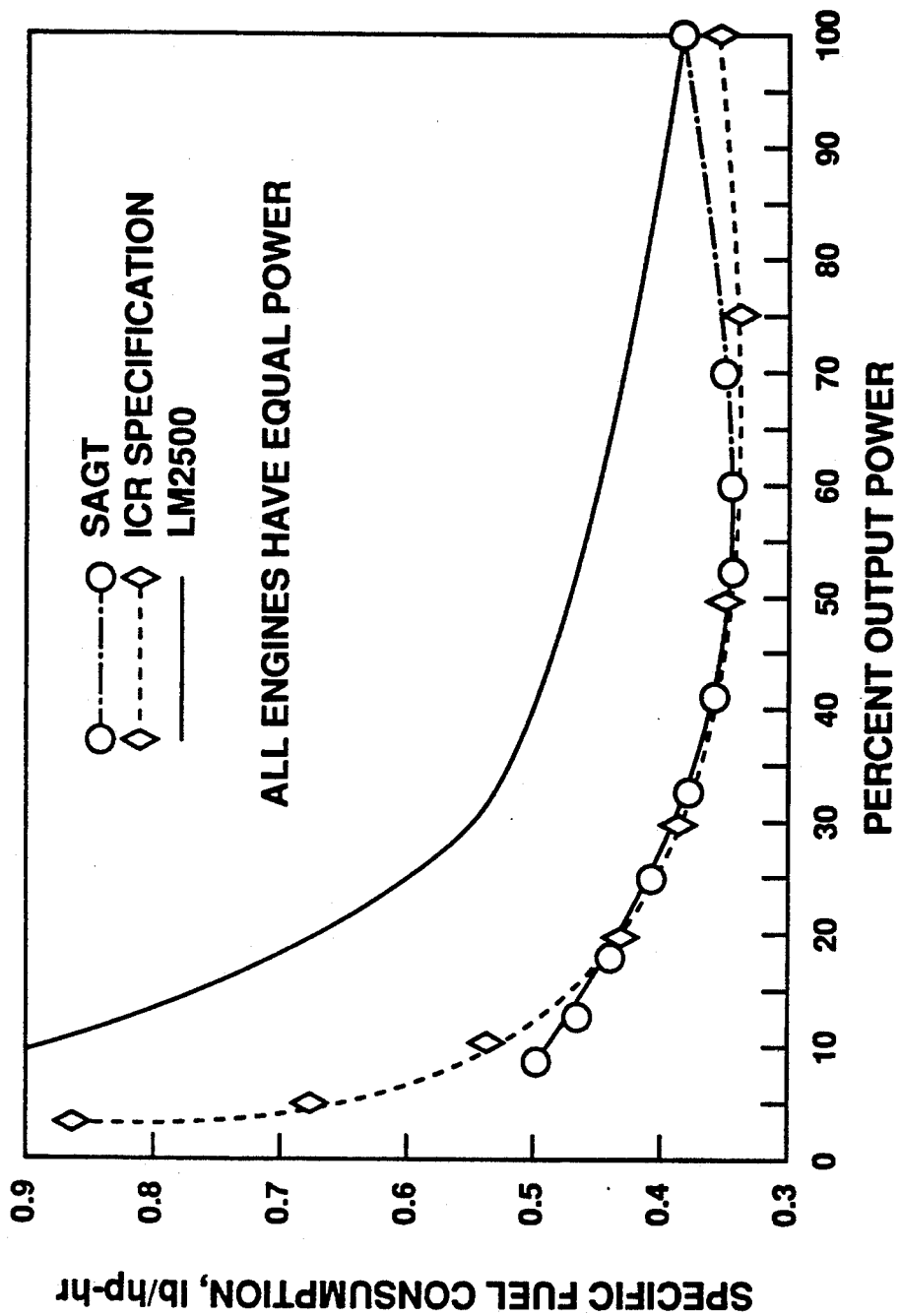
FIG. 6 illustrates comparative fuel consumption characteristics between the present invention and conventional engines.

Assuming that each of the engine types of FIG. 6 is of the same output power, the solid curve corresponds to the LM2500, which requires more fuel for any output power. The calculated SAGT data, points represented by circles, indicate that the SAGT system (of FIG. 1) may not be as efficient as the ICR system (with calculated points represented by diamonds) at high-power conditions. However, the SAGT engine with the reheat combustor of FIG. 3 would be more efficient than the ICR engine because reheat makes the engine approach Carnot-cycle efficiency.

Figure 7:
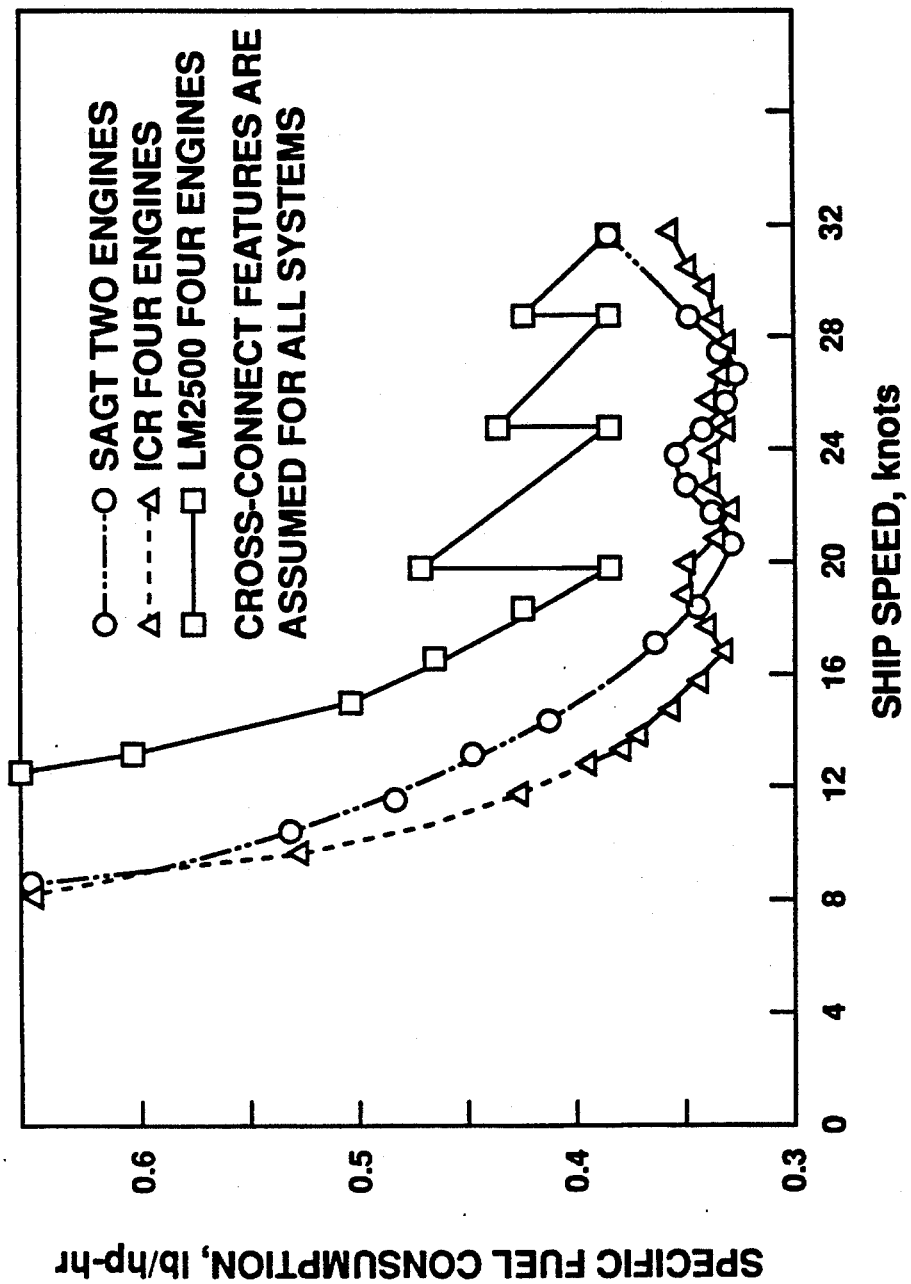
FIG. 7 illustrates specific fuel consumption characteristics versus ship speed, for the present invention as compared to the conventional engines.

The specific fuel consumption can be analyzed from the data in FIG. 6 and the ship's power profile, to obtain a plot of specific fuel consumption versus ship speed in knots, as shown in FIG. 7. The curve corresponding to the squares and solid line yields the specific fuel consumption for a destroyer (i.e., a DDG 51) with four LM2500 engines. The open circles represent the specific fuel consumption of a two-engine SAGT propulsion plant. The triangles represent a four-engine ICR propulsion plant. As shown in FIG. 6, as the fuel consumption increases, the output power percentage decreases, with the SAGT having roughly the same fuel consumption as the LM2500 at 100% output power.

Table 7 presents the required fuel tonnage for the alternate systems based on the same power profile. For this particular power profile, the fuel requirement for the SAGT power plants for one year is 8292 metric tons. Similar analyses made for the ICR and the baseline LM2500 power plants are shown. The percentage fuel savings obtained by the two-engine SAGT plant, 21.5%, approaches the listed 23.1% savings of the four-engine ICR plant. Fuel consumption of SAGT power plants employing the low pressure reheat combustor is less than that of the ICR power plant.

TABLE 7

Comparison of fuel consumption for selected alternative DDG-51 propulsion plants.

| Ship propulsion plant | Fuel tons/year | Savings % |
|---|---|---|
| Four-engine LM2500 | 10560 | — |
| Four-engine ICR | 8120 | 23.1 |
| Two-engine SAGT | 8292 | 21.5 |

Turning to the sizing of the propulsion plant, with the weight and volume data of the baseline LM2500 reference plant on the DDG-51 known and with all components of the propulsion plant assumed to be rectangularly-shaped in the computation of volumes, a comparison of such data with analogous weights and volumes of the propulsion components for the ICR power plants has been made. Since the power output of the ICR engines is larger (26500 hp) only 3.79 units were weighed into the final weight tally of Table 9.

In the data of Table 8, there is a separate accounting of propulsion weight supports (at a very conservative 30% of the primary weight) for such components as boilers and regenerators.

TABLE 8

SAGT system sizes and weight.

| COMPONENT | VOLUME, ft³ (m³) | WEIGHT, lbm (l.t.) |
|---|---|---|
| Gas turbine package | 3,830 (108.5) | 97,000 (44.0)a |
| Propulsion Foundations | 348 (9.8) | 86,913 (39.4) |
| Stack system | 10,130 (286.8) | 132,875 (60.3) |
| Boiler (wet) | 4,175 (118.2)b | 133,740 (60.7)c |
| Boiler Foundation | 160 (4.5) | 40,123 (18.2) |
| Intercooler/SWH/FWH | 641 (18.2) | 26,950 (12.2) |

TABLE 8-continued

SAGT system sizes and weight.

| COMPONENT | VOLUME, ft³ (m³) | WEIGHT, lbm (l.t.) |
|---|---|---|
| (wet) | | |
| Reduction Gear | 3,630 (102.7) | 248,000 (112.5) |
| Water Plant | 3,822 (108.2) | 147,400 (66.9) |
| Pumps and Motors | 138 (3.9) | 12,320 (5.6) |
| Total System | 26,874 (761) | 925,320 (419.8) | a) Based upon two LM2500 engines.
b) Assumed density is 250 lbm/ft3.
c) 30% of the boiler weight.

It is assumed that with a mass flow of 87 lbm/sec, the front end of the SAGT engine will be smaller than the front end of an LM1600. The hot-section compressor turbine will require a throughput mass flow of about 105 lbm/sec and thus, should be somewhat smaller than an LM2500 hot-section turbine. Finally, the free power turbine will handle a throughput of about 131 lbm/sec., which is close to design for the LM2500. Thus, the turbine weight of the SAGT engine is assumed to be that of a boxed Navy LM2500 engine.

Boiler weights and sizes (see above section) were investigated against existing hardware to assure accuracy of data. SAGT weights for the heat exchanger were wet weights, whereas the listed intercooler weights for the ICR are dry.

The overall weight of the RO water plant of Table 8 takes advantage of weight savings derived from the use of composite piping on the low-pressure seawater side of the system. The largest volume and weight savings derive from the compact stacks (see previous discussion), which are about one third the size of those in the baseline LM2500 system.

Table 9 compares the volumes and weights of the three alternative propulsion plants under study here. The ICR plant is slightly more compact in size than the baseline LM2500 plant, whereas the SAGT plant is about 30% more compact in size than the baseline. The ICR plant is heavier than the baseline plant. However, for a ship weight of 8000 tons, the difference between "light" and "full" load is about 400 to 500 tons. Therefore, an incremental weight of 68 tons will exhibit no negative ship impact unless that weight, by virtue of maldistribution, unduly shifts (e.g., elevates) the ship center of gravity. The nine-ton increment in the SAGT plant is, in fact, beneficially distributed relative to the ship center of gravity because the elevated, high-moment weight in the stacks is considerably reduced. Thus, for the SAGT plant, the 9-ton increase in weight is expected to yield a neutral, if not benign, ship impact.

TABLE 9

Alternative system volumes and weights.

| SYSTEM | VOLUME ft³ (m³) | RATIO | WEIGHT (lb (m.t)) | RATIO |
|---|---|---|---|---|
| LM2500 | 39140 (1108) | 1 | 906000 (411) | 1.0 |
| ICR | 38345 (1086) | 0.98 | 1056000 (479) | 1.17 |
| SAGT | 26874 (761) | 0.69 | 925320 (420) | 1.02 |

The significant reduction in overall ship volume suggests that the compactness of the SAGT plant is likely to have a positive ship impact on a DDG destroyer. This may be demonstrated by showing that the SAGT plant may be laid out in traditional DDG spaces without displacement of critical machinery systems.

Figure 8A:
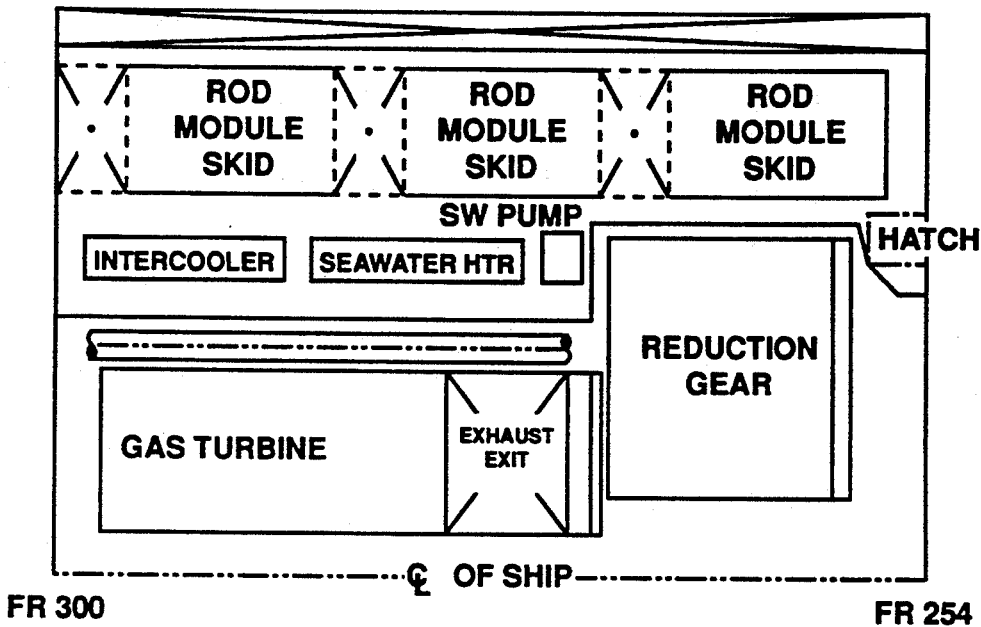
FIGS. 8(a) and 8(b) illustrate a layout of the SAGT plant in the aft portside engine room in a vessel, with FIG. 8(a) being a plan view of the second platform and FIG. 8(b) illustrating an overall side elevation view.
Figure 8B:
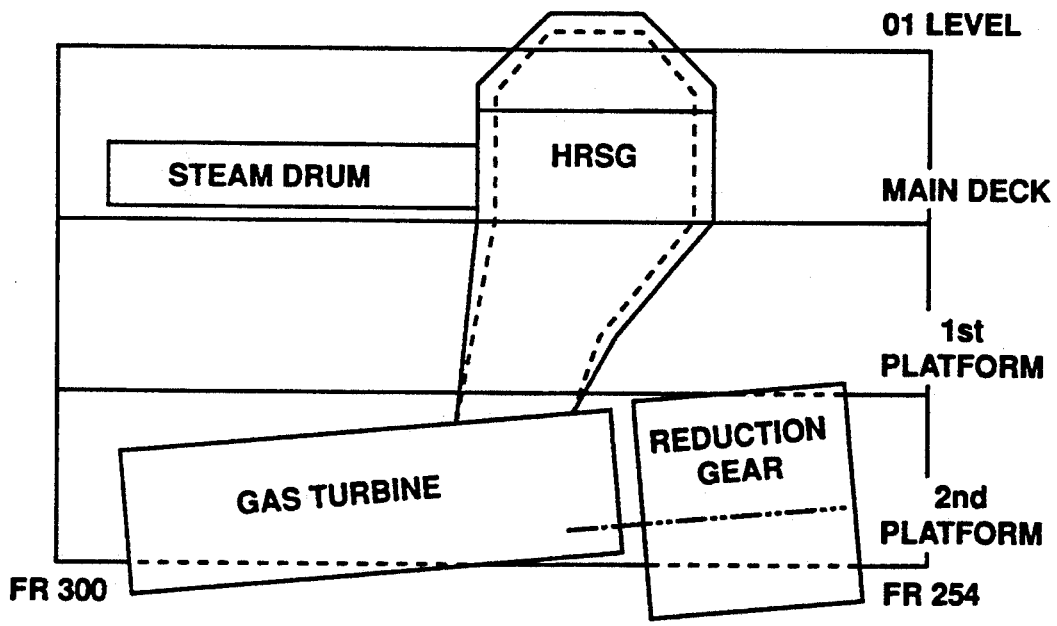
Figure 9:
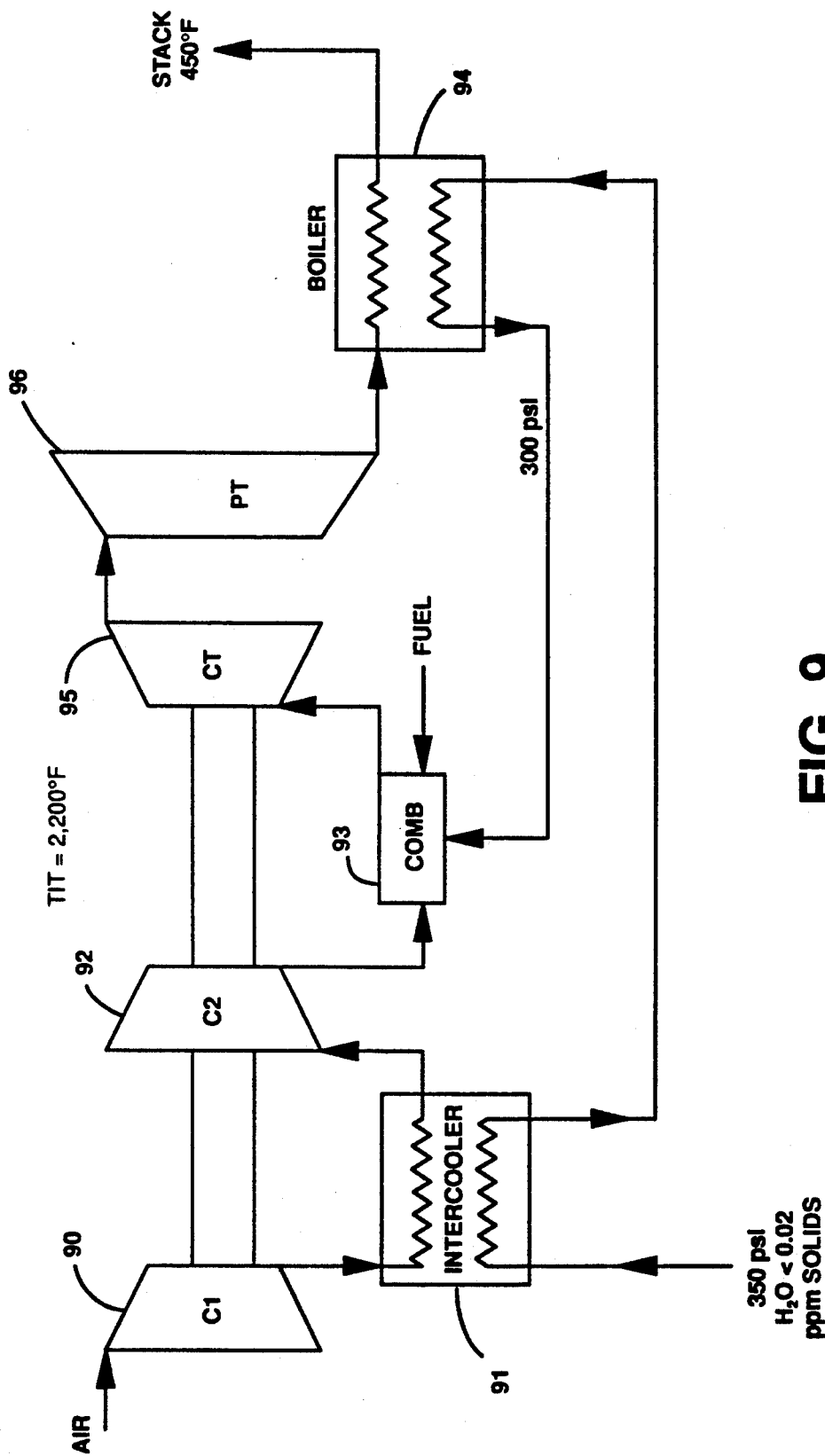
FIG. 9 is a schematic of a conventional SAGT engine having an intercooler.

FIGS. 8(a) and 8(b) illustrate the physical space of the aft engine room of a conventional LM2500 plant of a DDG-51 destroyer. The SAGT propulsion plant is approximately laid out in spaces allotted for the existing system. Selected scaled layouts include a plan view of the second platform, as shown in FIG. 8(a), and an overall side elevation of three decks, as shown in FIG. 8(b). To accommodate the ROD module skids on the second platform (FIG. 8(a)), the lube-oil storage and settling tanks, as well as their associated machinery, must be relocated to the first platform. The existing deck perimeter was extended toward starboard to within a reasonable standoff distance from the propulsion shaft and reduction gear. This provided sufficient space for other machinery that must be accommodated on this level, i.e., the intercooler, SWH, and the seawater pump.

In the SAGT-engine application, the deck standoff distance from the reduction gear was markedly reduced from that in the existing layout. The module skids were arranged in a manner which would allow sharing of the element pull space that is allocated between adjacent skids. Preferably, a minimum peripheral clearance of at least 18 inches around all machinery is maintained, but in a few noncritical situations, clearance can be reduced to 12-15 inches. As in the baseline layout, athwartship shifting of the uptake centerline begins above the 01 level, which is the point where the HRSG nozzle, shown in FIG. 8(b), terminates; i.e., the nozzle and turbine-exhaust centerlines are in the same longitudinal plane. Sufficient vertical height was allocated for the exhaust diffuser (below the HRSG) to ensure that flow distortion and its associated pressure loss will be minimal.

On the main deck, the space freed up by removal of the intake and uptake was effectively utilized in locating the remaining components of the SAGT plant. The layouts signify that the allotted spaces permit the SAGT plant to be installed with little if any negative ship impact on important machinery suites.

Further, the present inventors have found that the SAGT system is competitive with the existing power plants on a first-cost basis.

The SAGT engine, and in particular, the new SAGT engine with a dual (i.e., low- and high-) pressure combustor, are unique in that they simultaneously yield efficiency, compactness and affordability in a single package.

While propulsion power for a destroyer type vessel has been described above, development of the SAGT concept is applicable to main propulsion, ships-service power, pulse-power devices and combinations thereof, and land-based operations.

According to the invention, the new SAGT engine may be constructed from off the-shelf hardware and is relatively inexpensive to manufacture. SAGT engines without low-pressure, reheat combustors yield a 21.5% decrease in fuel consumption over the existing LM2500 simple-cycle engines used for Navy ships, whereas estimates based on the use of low-pressure reheat combustors indicate more than a 23% decrease in fuel consumption relative to the same baseline. The efficiency of the new SAGT is equal to or greater than that of combined steam and gas turbine (STAG) systems. This efficiency reduces the life-cycle cost of the system.

Further, the SAGT-engine power plant is 30% more compact than the alternative baseline simple-cycle power plant. Thus, the SAGT plant has a smaller footprint in comparison to the conventional engines. As a consequence, it has little or no negative impact upon other shipboard machinery systems. Further, the simultaneous combination of fuel efficiency, compactness, and competitive first cost makes for more affordability and low life-cycle cost. Another potential of the SAGT concept is the enhanced engine stability under load variations. This arises from the additional degrees of freedom inherent in steam augmentation, and low-pressure combustion. Further, the simple-cycle LM2500 engines and the STAG engine systems found in commercial service produce more nitrogen-oxide effluents than do the SAGT engines. Additionally, the LM2500 baseline engines are less efficient than SAGT or STAG engines. Typical efficiencies of 36% are observed for an LM2500 versus 42.5% for SAGT or STAG engines (for turbine inlets temperatures of 2200 F). In space-limited ship systems, the alternatives require more volume, and present more negative ship impact.

While the invention has been described in terms of specific embodiments, those skilled in the art will recognize that the invention can be practiced with modification within the spirit and scope of the appended claims.

Having thus described our invention, what we claim as new and desire to secure by Letters Patent is as follows:

1. A steam-augmented engine system, comprising:
   compression means for receiving air and discharging a first compressed air flow mass;
   first combustion means for receiving said first compressed air flow mass, a predetermined quantity of fuel, a predetermined quantity of purified water and a first predetermined quantity of water and steam mass, and for generating a first combustion product therefrom;
   heat exchange means for producing said first predetermined quantity of steam mass and a second predetermined quantity of water and steam mass;
   first expansion means for receiving and expanding said first combustion product from said first combustion means to generate a first power output for powering said compression means and for discharging an expanded combustion product;
   second combustion means for receiving said product, a predetermined quantity of fuel and said second predetermined quantity of water and steam mass from said heat exchange means, and for generating a second combustion product therefrom;
   second expansion means for receiving and expanding said second combustion product from said second combustion means to generate a second power output and for discharging an exhaust product, said exhaust product being discharged to said heat exchange means;
   regulating means for regulating said fuel, said purified water and said first predetermined and steam mass introduced into said first combustion means and for regulating said first combustion product, said fuel and said second predetermined water and steam mass introduced into said second combustion means, said first and second combustion means operating along a predetermined power profile, such that said second combustion means produces a stoichiometric combustion at a power point; and
   sea-water purifying means, coupled to said heat exchange means, for receiving sea-water, purifying said water and for discharging a first portion of the purified water to said heat exchange means.

2. A system according to claim 1, wherein said water purifying means is coupled to said first combustion means for providing said purifying water thereto, said purifying water provided to said first combustion means being a second portion of said purified water produced by said sea-water purifying means.

3. A system according to claim 1, wherein a mass flow of said first expansion means is substantially constant from a Cheng point to a stoichiometric point of said predetermined power profile.

4. A system according to claim 1, wherein total mass flow of purified water plus steam from the heat exchanger means injected into said first combustion means is constant.

5. A system according to claim 1, wherein said first predetermined quantity of water and steam mass has a first characteristic and said second predetermined quantity of water-steam mass has a second characteristic.

6. A system according to claim 5, wherein said first and second characteristics are respective pressures of the first and second predetermined quantities of water and steam mass.

7. A system according to claim 1, wherein said first predetermined quantity of water and steam mass has a pressure greater than that of said second predetermined quantity of water-steam mass.

8. A system according to claim 1, wherein said regulating means includes means for regulating said second combustion means to produce a stoichiometric combustion at a predetermined point along said predetermined power profile, said predetermined point being a point of maximum power.

9. A system according to claim 1, wherein said heat exchange means comprises a two-pressure boiler.

10. A system according to claim 1, wherein a stoichiometric combustion by said second combustion means is based on a predetermined maximum compressed air flow mass of said compressed air flow mass, said predetermined maximum compressed air flow mass comprising a predetermined stoichiometric air flow mass with respect to said predetermined quantity of fuel.

11. A system according to claim 1, wherein said water purifying means comprises water desalinating means.

12. A steam-augmented engine system, comprising:
    compression means for receiving ambient air and discharging a first compressed air flow mass;
    first combustion means for receiving said first compressed air flow mass, a predetermined quantity of fuel, a predetermined quantity of modified water and a first predetermined quantity of water-steam mass, and for generating a first combustion product therefrom;
    heat exchange means for producing said first predetermined quantity of water-steam mass and a second predetermined quantity of water-steam mass;
    first expansion means for receiving and expanding said first combustion product from said first combustion means to generate a first power output for powering said compression means and for discharging an expanded combustion product as a second power output;

second combustion means for receiving said second power output, a predetermined quantity of fuel and said second predetermined quantity of water-steam mass from said heat exchange means, and for generating a second combustion product therefrom;

second expansion means for receiving and expanding said second combustion product from said second combustion means to generate a third power output and for discharging an exhaust product, said exhaust product being discharged to said heat exchange means;

regulating means for regulating said compressed air flow mass, said fuel, said modified water and said first predetermined quantity of water-steam mass introduced into said first combustion means and for regulating said second power output, said fuel and said second predetermined quantity of water-steam mass introduced into said second combustion means, said first and second combustion means operating along a predetermined power profile, such that said second combustion means produces a stoichiometric combustion at a predetermined point of said predetermined power profile; and water purifying means for receiving water, modifying said water to produce said modified water and for discharging a first portion of the modified water to said heat exchange means, wherein said water purifying means is coupled to said first combustion means for providing said modified water thereto, said modified water provided to said first combustion means being a second portion of said modified water produced by said water modifying means, a mass flow of said first expansion means being substantially constant from a Cheng point to a stoichiometric point of said predetermined power profile, said Cheng point being a point of maximum thermal efficiency.

13. A method of generating power, the method comprising the following steps:

compressing air to produce a first compressed air flow mass;

modifying water, including desalinating the water to produce a modified water and discharging a first portion of the modified water to heat exchange means;

producing a first predetermined quantity of water-steam mass and a second predetermined quantity of water-steam mass in said heat exchange means;

providing said first compressed air flow mass to a first combustion means along with a predetermined quantity of fuel, a predetermined quantity of said modified water and said first predetermined quantity of water-steam mass, and generating a first combustion product therefrom;

expanding said first combustion product and discharging an expanded combustion product as a first power output;

receiving in a second combustion means said first power output, a predetermined quantity of fuel and said second predetermined quantity of water-steam mass from said heat exchange means, and generating a second combustion product therefrom;

expanding said second combustion product to generate a second power output and discharging an exhaust product to said heat exchange means; and controlling said first compressed air flow mass, said fuel, said modified water and said first predetermined quantity of water-steam mass introduced into said first combustion means and regulating said first power output, said fuel and said second predetermined water-steam mass introduced into said second combustion means such that said first and second combustion means operate along a predetermined power profile and such that said second combustion means produces a stoichiometric combustion at a predetermined point of said predetermined power profile, and wherein a mass flow of the second power output is substantially constant from a Cheng point to said predetermined point of said predetermined power profile.

14. A method according to claim 13, wherein said predetermined point is a stoichiometric point.

15. An engine comprising:

a high pressure combustor;

a low pressure combustor;

a first expansion means operatively connected between the said high pressure combustor and the said low pressure combustor;

a second expansion means operatively connected to an output of the said low pressure combustor;

flow sensor and valve means for distributing water and steam and air to said high pressure combustor and for distributing steam to said low pressure combustor means so that the mass flow of the water, steam and air in the high-pressure combustor is held constant over output power of the engine from the Cheng point to the stoichiometric point.

* * * * *